United States Patent
Yorimatsu et al.

(10) Patent No.: US 6,687,678 B1
(45) Date of Patent: Feb. 3, 2004

(54) USE'S SCHEDULE MANAGEMENT SYSTEM

(75) Inventors: Fumio Yorimatsu, Yamato (JP); Tohru Furukawa, Hadano (JP); Ioshiharu Ohkaze, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/390,270

(22) Filed: Sep. 7, 1999

(30) Foreign Application Priority Data

Sep. 10, 1998 (JP) ............................................ 10-256510

(51) Int. Cl.⁷ ............................................... G06F 17/60
(52) U.S. Cl. ........................................... 705/8; 345/963
(58) Field of Search ............................... 705/8; 345/963

(56) References Cited

U.S. PATENT DOCUMENTS

| | | | | |
|---|---|---|---|---|
| 4,542,480 A | * | 9/1985 | Orii | 707/3 |
| 5,124,912 A | * | 6/1992 | Hotaling et al. | 705/9 |
| 5,197,000 A | * | 3/1993 | Vincent | 705/8 |
| 5,303,145 A | * | 4/1994 | Griffin et al. | 705/9 |
| 5,317,699 A | * | 5/1994 | Sugita et al. | 711/147 |
| 5,634,100 A | * | 5/1997 | Capps | 705/9 |
| 5,692,125 A | * | 11/1997 | Schloss et al. | 705/9 |
| 5,781,769 A | * | 7/1998 | Weber | 713/502 |
| 5,805,444 A | * | 9/1998 | Seymour | 700/16 |
| 5,848,395 A | * | 12/1998 | Edgar et al. | 705/9 |
| 5,855,006 A | * | 12/1998 | Huemoeller et al. | 705/9 |
| 5,893,073 A | * | 4/1999 | Kasso et al. | 705/8 |
| 5,911,134 A | * | 6/1999 | Castonguay et al. | 705/9 |
| 5,943,676 A | * | 8/1999 | Boothby | 707/201 |
| 6,016,478 A | * | 1/2000 | Zhang et al. | 705/9 |
| 6,108,640 A | * | 8/2000 | Slotznick | 705/26 |
| 6,266,295 B1 | * | 7/2001 | Parker et al. | 368/28 |
| 6,272,074 B1 | * | 8/2001 | Winner | 368/10 |
| 6,278,456 B1 | * | 8/2001 | Wang et al. | 345/700 |
| 6,370,566 B2 | * | 4/2002 | Discolo et al. | 709/206 |

FOREIGN PATENT DOCUMENTS

JP 09091341 A * 4/1997 ........... G06F/17/60

OTHER PUBLICATIONS

Coleman, Dale. "Meeting Maker . . . " MacWeek v7, n44, p34, Nov. 8, 1993 [Dialog].*
Yakal, Kathy. "Organized time." Computer Shopper v18, n2, p308, Feb. 1998 [Dialog].*
Oppenheim, Richard. "Keeping information ready," Accounting Technology v12n2 pp:41–46, Feb./Mar. 1996 [Dialog].*
Mosely, Lonnie and Boodey, David. "Mastering Microsfot® Office 97 Professional Edition," ©1997, ISBN: 0–7821–1925–5.*
Wolk, Liz. "Catapult Lotus Notes 4.5 Calendar and Scheduling," ©1997.*

* cited by examiner

*Primary Examiner*—Tariq R. Hafiz
*Assistant Examiner*—C. Michelle Colón
(74) *Attorney, Agent, or Firm*—Louis Herzberg

(57) ABSTRACT

This schedule management system can flexibly cope with an exceptional change or deletion of a part of a schedule. In registering a routine schedule, a unique number (routine number) is added to a series of such schedules. The schedule so registered is so adapted to be able to change only the content of the schedule without changing the added routine number in changing individual schedule. Therefore, an exceptional schedule the content of which has been changed can be flexibly managed by being deleted/changed in a bundle together with other routine schedule, for example. A routine basic condition such as every other day and every Monday and a routine exceptional condition such as shifting down week end and holiday to next day can be set in the routine pattern.

10 Claims, 14 Drawing Sheets

User Management Master Table 210     FIG. 3    215

| User Name (User ID) 211 | Schedule Data Table Server 213 | Name of Section User Belongs |
|---|---|---|
| Taro Yamada (Taro Yamada/IBM) | Hakozaki Server/IBM | • |
| Hanako Suzuki (Hanako Suzuki/IBM) | Rappongi Server/IBM | • |
| Jiro Tanaka (Jiro Tanaka/IBM) | Hakozaki Server/IBM | • |
| • | • | • |
| • | • | • |

User Schedule Data Table 250     FIG. 4

| Routine No. 251 | Date 253 | Start Time 255 | End Time 257 | Subject 259 |
|---|---|---|---|---|
| X0001 | 1998/09/01 (Tue) | 9:00 | 12:00 | Meeting |
| X0001 | 1998/09/02 (Wed) | 9:00 | 12:00 | Meeting |
| X0001 | 1998/09/03 (Thu) | 9:00 | 12:00 | Meeting |
| X0001 | 1998/09/04 (Fri) | 9:00 | 12:00 | Meeting |
| X0001 | 1998/09/07 (Mon) | 9:00 | 12:00 | Meeting |

Holiday Management Table 230     FIG. 5

| National Holiday Y/M/D 231 | National Holiday Name 233 | Company Holiday Y/M/D 235 | Company Holiday Name 237 |
|---|---|---|---|
| 01/01 | New Year | 1998/01/12 | Founding Day |
| 01/15 | Adult Day | | |
| 02/11 | Founding Day | | |
| 1998/03/21 | Equinox | | |
| • | • | • | • |

FIG. 6

| FIG. 6A |
|---------|
| FIG. 6B |

FIG. 6A

Input Data 210

| Time 211 | End Time 213 | Subject 215 | Routing Period 217 | Routing Condition 219 |
|---|---|---|---|---|
| 9:00 | 12:00 | Meeting | 1998/09/01 -1998/09/07 | Every Day Except Holiday |

Holiday Management Table 230

| National Holiday Y/M/D 231 | National Holiday Name 233 | Company Holiday Y/M/D 235 | Company Holiday Name 237 |
|---|---|---|---|
| 01/01 | New Year | 1998/01/12 | Founding Day |
| 01/15 | Adult Day | ... | ... |
| 02/11 | Founding Day | ... | ... |
| 1998/03/21 | Equinox | ... | ... |

401 Generate and Process New Routine Schedule
↓
403 Input Routine Data in Input Part
↓
405 Calculate Date Outputted Routine Schedule from Input Data and Holiday Data
↓
407 Generate Routine Number

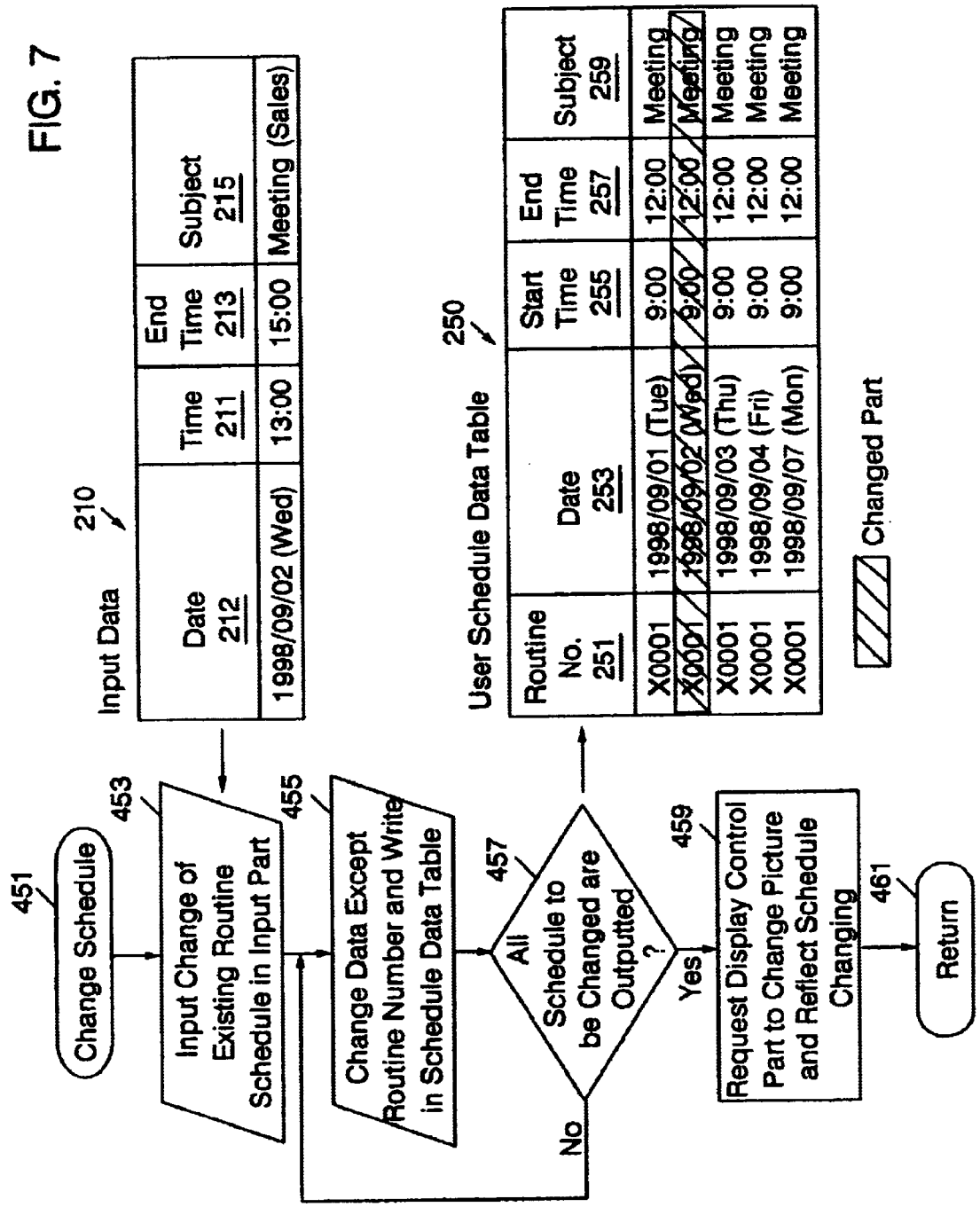

FIG. 13

USE'S SCHEDULE MANAGEMENT SYSTEM

FIELD OF THE INVENTION

This invention relates to a schedule management system and, more particularly, to a system which allows a plurality of users to efficiently register and manage a routine, regular or periodical schedule occurring in a substantially constant condition.

BACKGROUND OF THE INVENTION

As described in PUPA 5-61876, a schedule management system is provided for inputting a repetitive or periodical schedule such as "Meeting from 10:00 to 11:00 every day for 10 days from today" and "Morning meeting from 9:00 on every Monday".

However, irregular (or exceptional) factors including a partial change/deletion such as "Meeting starts at 2:00 only today" and: "Morning meeting is canceled in this week" are often brought in a periodically-occurring schedule (hereinafter referred to as a routine schedule) of this kind. Also, it may be desired to delete a registered schedule in a bundle or change the content thereof as a result of a review of a project.

A conventional schedule management system was unable to cope with such irregurality because the schedule is generated in the manner similar to a schedule in which a routine schedule was normally or non-exceptionally registered according to a pattern in which a routine pattern was pre registered and could not remove an irregular schedule from an object to be managed as a routine schedule or manage after input (delete or change the routine schedule in a bundle). In addition, the conventional system was unable to cope with a partial change of a pattern such as "Morning meeting starts at 10:00 in this month only".

Further, when it was desired to change a routine pattern of a specific period, for example, to change a schedule which was initially registered for every Monday for one year from January 1st to every Tuesday from April to December, a later change encompassing periods of two patterns (every Wednesday from February to Nay, for example) could not be effected at one time so that the schedule had to be changed for each period (from February to March and from April to May) because the schedule was managed separately for each period (from January to March and from April to December). This invited a cumbersome operation.

Therefore, it is a further object of this invention to provide a schedule management system of an improved operability which flexibly cope with a routine schedule in which an exceptional change occurs.

It is a further object of this invention to provide a schedule management system which allows a routine schedule and a normal schedule to be grasped at the same time while intuitively recognizing the distinction therebetween.

It is another object of this invention to provide a schedule management system in which resources required upon execution are reduced.

BRIEF DESCRIPTION OF THE INVENTION

In registering a routine schedule, a unique number (routine number) is added to a series of such schedules. The schedule so registered is so adapted to be able to change only the content of the schedule without changing the added routine number in changing individual schedule. Therefore, an exceptional schedule the content of which has been changed can be flexibly managed by being deleted/changed in a bundle together with other routine schedule, for example. A routine basic condition such as every other day and every Monday and a routine,exceptional condition such as shifting down week end and holiday to next day can be set in the routine pattern.

This invention provides, in one aspect thereof, a method of displaying schedule data on a schedule management apparatus having a display screen and an input device, said method comprising the steps of;

(a) receiving a user input including a schedule starting time, a schedule ending time and a condition of a day on which a schedule is set, (b) generating and registering schedule data including a schedule starting time and a schedule ending time which are associated with a common routine number for each of a plurality of dates corresponding to said condition of a day on which a schedule is set, and (c) displaying schedule data which is associated with said routine number distinctively from schedule data which is not associated with a routine number.

In the claims of this specification, a "condition of a day on which a schedule is set" is a concept including every day, a basic condition such as every day, every other day (or every n+1 days) every second Wednesday of a month (or every m-th particular week day of a month), and an exceptional condition such as "a holiday is not registered" and "a registration on a holiday is shifted up to the previous day".

This invention provides, in another aspect thereof, a method of displaying schedule data on a schedule management apparatus having a display screen and an input device, said method comprising the steps of;

(a) displaying a schedule data input panel in response to an operator's operation instructing a schedule input, (b) receiving a user input including a schedule starting time, a schedule ending time, a basic condition of a day on which a schedule is set and an exceptional condition of a day on which a schedule is set in said schedule data input panel, (c) calculating a plurality of setting dates corresponding to said basic condition of a day on which a schedule is set and said exceptional condition of a day on which a schedule is set, (d) generating a routine number having a common value which is allocated to each of the schedule data of said plurality of setting dates, (e) generating schedule data including a schedule starting time and a schedule ending time for each of said plurality of setting dates and storing them in association with said routine number, and (f) displaying schedule data which is associated with said routine number distinctively from schedule data which is not associated with a routine number.

This invention provides, in one aspect thereof, a method of displaying schedule data on a schedule management apparatus having a display screen and an input device, said method comprising the steps of;

(a) receiving a user input including a schedule starting time, a schedule ending time and a condition of a day on which a schedule is set, (b) generating and registering schedule data including a schedule starting time and a schedule ending time which are associated with a common routine number for each of a plurality of dates corresponding to said condition of a day on which a schedule is set, and (c) displaying schedule data which is associated with said routine number.

This invention provides, in one aspect thereof, a method of changing schedule data on a schedule management apparatus having a display screen and an input device, said method comprising, the steps of;
- (a) displaying a plurality of user schedule information items including information of a schedule starting time and a schedule ending time and a condition of a day on which a schedule is set,
- (b) detecting that one of said plurality of user schedule information items is specified,
- (c) obtaining information of a changed period and a changed content inputted by an operator, and
- (d) reregistering user schedule data included in said obtained changed period and associated with a routine number which is common to the routine number associated with said one user schedule information item according to the changed content.

This invention provides, in a further aspect thereof, a schedule management apparatus having a display screen and an input device, said apparatus comprising;
- (a) a schedule data input panel for receiving a user input including a schedule starting time, a schedule ending time and a condition of a day on which a schedule is set,
- (b) a routine schedule data generating part for generating and registering schedule data including a schedule starting time and a schedule ending time which are associated with a common routine number for each of a plurality of dates corresponding to said condition of a day on which a schedule is set, and
- (c) a display part for displaying schedule data which is associated with said routine number.

This invention provides, in a further aspect thereof, a schedule management apparatus having a display screen and an input device, said method comprising;
- (a) a schedule data input panel displayed in response to an operator's operation instructing a schedule input for receiving a user input including a schedule starting time, a schedule ending time, a basic condition of a day on which a schedule is set and an exceptional condition of a day on which a schedule is set in said schedule data input panel,
- (b) a routine number generating part for generating a routine number,
- (c) a routine schedule data generating part for calculating a plurality of setting dates corresponding to said basic condition of a day on which a schedule is set and said exceptional condition of a day on which a schedule is set, and generating schedule data including a schedule starting time and a schedule ending time for each of said plurality of setting dates, and
- (d) a display control part for displaying schedule data which is associated with said routine number distinctively from schedule data which is not associated with a routine number.

This invention provides, in a further aspect thereof, a schedule management apparatus having a display screen and an input device, said method comprising;
- (a) a display part for displaying a plurality of user schedule information items including information of a schedule starting time and a schedule ending time,
- (b) an event detecting part for detecting that one of said plurality of user schedule information items is specified,
- (c) a user schedule data input panel for obtaining information of a changed period and a changed content inputted by an operator, and
- (d) a control part for reregistering user schedule data included in said obtained changed period and associated with a routine number which is common to the routine number associated with said one user schedule information item according to the changed content.

This invention provides, in a further aspect thereof, a storage medium storing a schedule management program for displaying schedule data on a schedule management apparatus having a display screen and an input device, said program comprising;
- (a) a program code instructing said schedule management apparatus to receive a user input including a schedule starting time, a schedule ending time and a condition of a day on which a schedule is set,
- (b) a program code instructing said schedule management apparatus to generate and registering schedule data including a schedule starting time and a schedule ending time which are associated with a common routine number for each of a plurality of dates corresponding to said condition of a day on which a schedule is set, and
- (c) a program code instructing said schedule management apparatus to display schedule data which is associated with said routine number distinctively from schedule data which is not associated with a routine number.

This invention provides, in a further aspect thereof, a storage medium storing a schedule management program for displaying schedule data on a schedule management apparatus having a display screen and an input device, said program comprising;
- (a) a program code instructing said schedule management apparatus to display a schedule data input panel in response to an operator's operation instructing a schedule input,
- (b) a program code instructing said schedule management apparatus to receive a user input including a schedule starting time, a schedule ending time, a basic condition of a day on which a schedule is set and an exceptional condition of a day on which a schedule is set in said schedule data input panel,
- (c) a program code instructing said schedule management apparatus to calculate a plurality of setting dates corresponding to said basic condition of a day on which a schedule is set and said exceptional condition of a day on which a schedule is set,
- (d) a program code instructing said schedule management apparatus to generate a routine number having a common value which is allocated to each of the schedule data of said plurality of setting dates,
- (e) a program code instructing said schedule management apparatus to generate schedule data including a schedule starting time and a schedule ending time for each of said plurality of setting dates and storing them in association with said routine number, and
- (f) a program code instructing said schedule management apparatus to display schedule data which is associated with said routine number distinctively from schedule data which is not associated with a routine number.

This invention provides, in a further aspect thereof, a storage medium storing a schedule management program for displaying schedule data on a schedule management apparatus having a display screen and an input device, said program comprising;

(a) a program code instructing said schedule management apparatus to receive a user input including a schedule starting time, a schedule ending time and a condition of a day on which a schedule is set, (b) a program code instructing said schedule management apparatus to generate and registering schedule data including a schedule starting time and a schedule ending time which are associated with a common routine number for each of a plurality of dates corresponding to said condition of a day on which a schedule is set, and (c) a program code instructing said schedule management apparatus to display schedule data which is associated with said routine number.

This invention provides, in a further aspect thereof a storage medium storing a schedule management program for changing schedule data on a schedule management apparatus having a display screen and an input device, said program comprising;

(a) a program code instructing said schedule management apparatus to display a plurality of user schedule information items including information of a schedule starting time and a schedule ending time and a condition of a day on which a schedule is set, (b) a program code instructing said schedule management apparatus to detect that one of said plurality of user schedule information items is specified, (c) a program code instructing said schedule management apparatus to obtain information of a changed period and a changed content inputted by an operator, and (d) a program code instructing said schedule management apparatus to reregister user schedule data included in said obtained changed period and associated with a routine number which is common to the routine number associated with said one user schedule information item according to the changed content.

This invention provides, in a further aspect thereof, a storage medium storing a schedule management program for changing schedule data on a schedule management apparatus having a display screen and an input device, said program comprising;

(a) a program code instructing said schedule management apparatus to display a plurality of user schedule information items including information of a schedule starting time and a schedule ending time and a condition of a day on which a schedule is set, (b) a program code instructing said schedule management apparatus to detect that one of said plurality of user schedule information items is specified, (c) a program code instructing said schedule management apparatus to obtain information of a deleted period inputted by an operator, and (d) a program code instructing said schedule management apparatus to delete user schedule data included in said obtained deleted period and associated with a routine number which is common to the routine number associated with said one user schedule information item.

BRIEF DESCRIPTION OF THE DRAWINGS

FIG. 3 is a schematic chart of the user management master table in the preferred embodiment of this invention.

FIG. 4 is a schematic chart of the user schedule data table in the preferred embodiment of this invention.

FIG. 5 is a schematic chart of the holiday management table in the preferred embodiment of this invention.

FIG. 7 is a flow chart showing a procedure of changing one of routine schedules of this invention.

FIG. 13 is a chart showing a routine condition input panel in the preferred embodiment of this invention.

DETAILED DESCRIPTION OF THE INVENTION

A. Hardware Configuration

Figure 1:
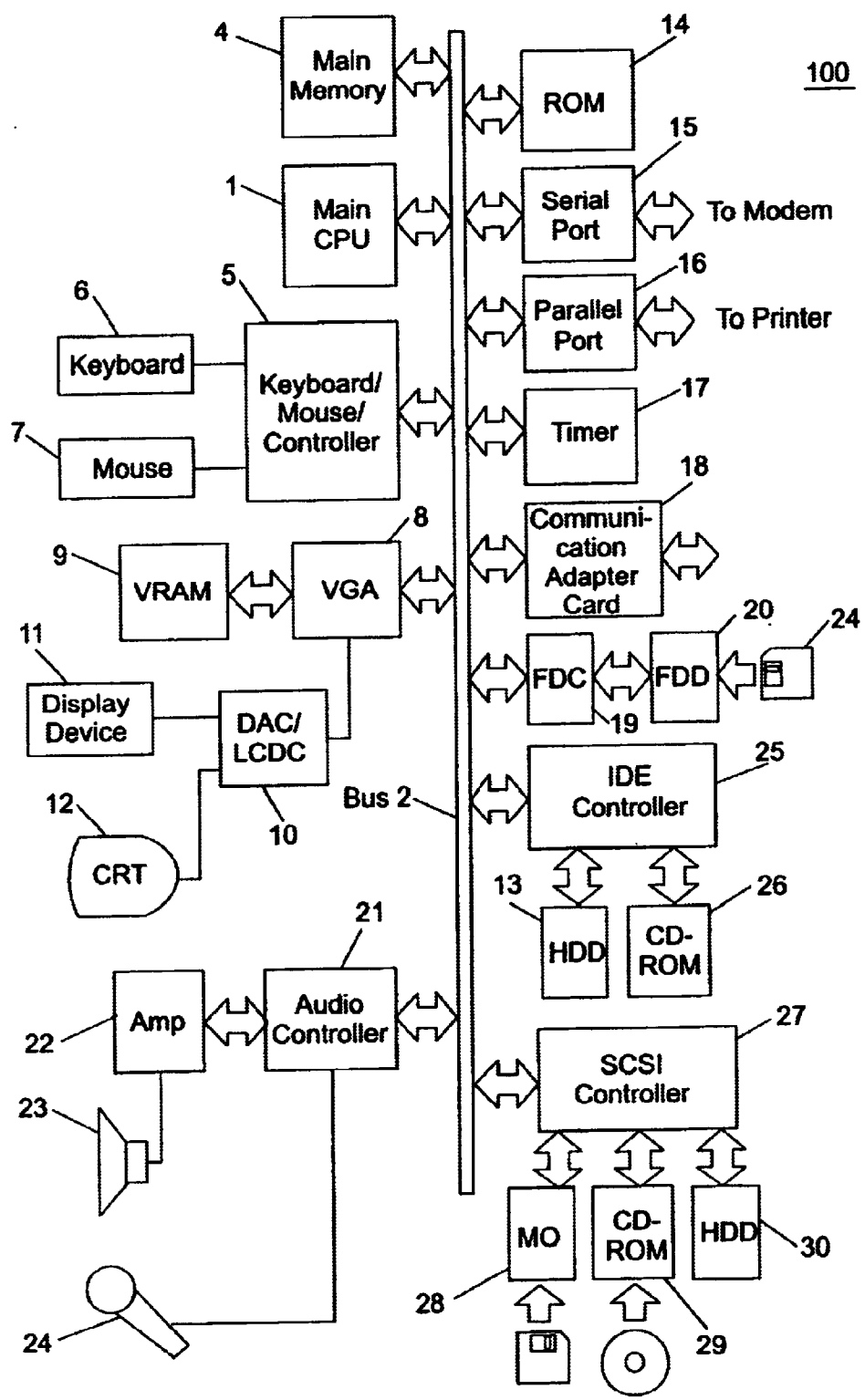
FIG. 1 is a block diagram showing a hardware configuration.

FIG. 1 shows a schematic diagram of a hardware configuration implementing the schedule management apparatus of this invention. The schedule management apparatus 100 comprises a central processing unit (CPU) 1 and a memory 4. The CPU 1 and the memory 4 are connected to a hard disk devices 13, 31 as an auxiliary storage via a bus 2. A floppy disk device 20 (or recording medium drives 26, 28, 29, 30 such as an MO 28 and CD-ROM 26, 29) is connected to the bus 2 through a floppy disk controller 19 (or controllers such as an IDE controller 25, a SCSI controller 27).

A floppy disk (or recording medium such as an NO and CD-ROM) is inserted to the floppy disk device 20 (or recording medium drives 26, 28, 29, 30 such as an MO and CD-ROM). A computer program code which gives instructions to the CPU and the like in cooperation with an operating system to practice this invention is recorded in the floppy disk, the hard disk device 13, and a RCM 14 and executed by being loaded in the memory 4. The computer program code may be compressed or divided into pieces for recording in a plurality of media.

Further, the schedule management apparatus 100 may be a system which is provided with a user interface hardware including a pointing device 7 for inputting screen position information (a mouse, a joystick, track ball, etc.) or a keyboard 6 supporting a key input, and a displays 11, 12 for presenting image data to the user. A speaker 23 receives an audio signal from an audio controller 21 via an amplifier 22 for output as a voice. The schedule management apparatus 100 can communicate with other computer via a serial port 15 and a modem or a communication adapter 18 such as a token ring.

As such, it will be readily understood that this invention may be implemented by a conventional personal computer (PC), a workstation, a portable information terminal, a computer which is incorporated in various home electric appliances such as a television and a facsimile, or a combination thereof. It should be noted, however, that these components are given for exemplary purpose and it is not meant that all of these components are the indispensable components of this invention. Because this invention is directed to management of a schedule, components such as the serial port 15, the communication adapter card 18, the audio controller 21, the amplifier 22 and the speaker 23 are not necessary.

While the operating system may desirably include an operating system which supports a GUI multi-windows environment as a standard such as Windows (a trademark of Microsoft Corporation), OS/2 (a trademark of International Business Machines Corporation), X-WINDOW System (a trademark of MIT) on AIX (a trademark of International Business Machines Corporation), the operating system is not limited to any specific operating system environment.

While FIG. 1 shows a system in a stand alone environment, this invention may be implemented in the form of a client/server system in which a client machine is LAN connected to a server machine by Ethernet or a token ring, etc., and the server machine side may be provided with a control part and various management tables to be described later while the rest of functions are disposed in the client macchine side. As such, it is a matter of choice in designing to dispose what functions in the server side and the client side, and various modifications including a combination of a plurality of machines and distribution of functions to them for practicing this invention is a concept included in the spirit of this invention.

B. System Configuration

The system configuration of this invention is now described with reference to the block diagram of FIG. 2. In the preferred embodiment of this invention, the schedule management system comprises an input part 101, an event detecting part 103, a routine schedule number generating part 113, a control part 105, a table input/output part 106, a display control part 107, local data storage part 108, a display part 109, a schedule display window generating part 111, a routine schedule data generating part 112, user schedule management tables 121, 131, holiday management tables 123, 133, and user management master tables 125, 135.

The input part 101 obtains a signal from a pointing device such as a mouse and converts it to event information. In the preferred embodiment of this invention, a device driver and an operating system bear this function. The event detecting part 103 interprets the content of an inputted event to determine the kind of the event.

The control part 105 controls the schedule display window generating part 111 and the routine schedule number generating part 113, etc. The routine schedule number generating part 113 generates a routine schedule number which is uniquely identifiable in the user. The table input/output part 106 accesses to various tables located locally and remotely to obtain and write a content from and in the tables. The schedule data input panel generating part 104 generates an input panel for inputting a routine schedule.

The display control part 107 generates and changes data for display. The display part 109 converts information received from the display control part 107 and sends it to the display device. In the preferred embodiment of this invention, a device driver and an operating system bear this function.

The user management master tables 125, 135 are tables for managing the location of a server in which user's schedule information under the management of the schedule management system is resident. The user management master tables 125, 135 are tables which are registered in all servers existing in the schedule management system. In the preferred embodiment of this invention, the integrity of data in the user management master tables in each server is maintained by a replication (differential duplication) which is done among the servers. This technology is implemented by an RDB (relational database) on a server which is used for storing data. While many RDBs having such function are currently available, this invention is not limited to any mode of such technologies.

FIG. 3 is a schematic chart of the user management master table in the preferred embodiment of this invention. As shown in FIG. 3, a user name (user ID) 211, a schedule data table server 213, the name of section the user belongs and other user information are managed in the user management master table 210 in the preferred embodiment of this invention. The schedule data table server 213 is address information specifying a server which stores a schedule data table of each user. A code of the section to which each user belongs is managed in the name of section user belongs 215.

The user schedule management tables 121, 131 are tables for managing schedule information of each user. FIG. 4 is a schematic chart of the user schedule data table in the preferred embodiment of this invention. The user schedule data table 250 in the preferred embodiment of this invention is managed for each user ID and a routine number 251, the date 253, the starting time 255, the ending time 257, the subject 259 are managed therein. The date, the starting time and the ending time in which the schedule occurs are stored in the date 253, the starting time 255 and the ending time 257, respectively. Information of the subject and the place of the schedule is also stored in the subject 259. The routine schedule number 251 is information for determining as which routine schedule the schedule is managed.

Figure 6B:
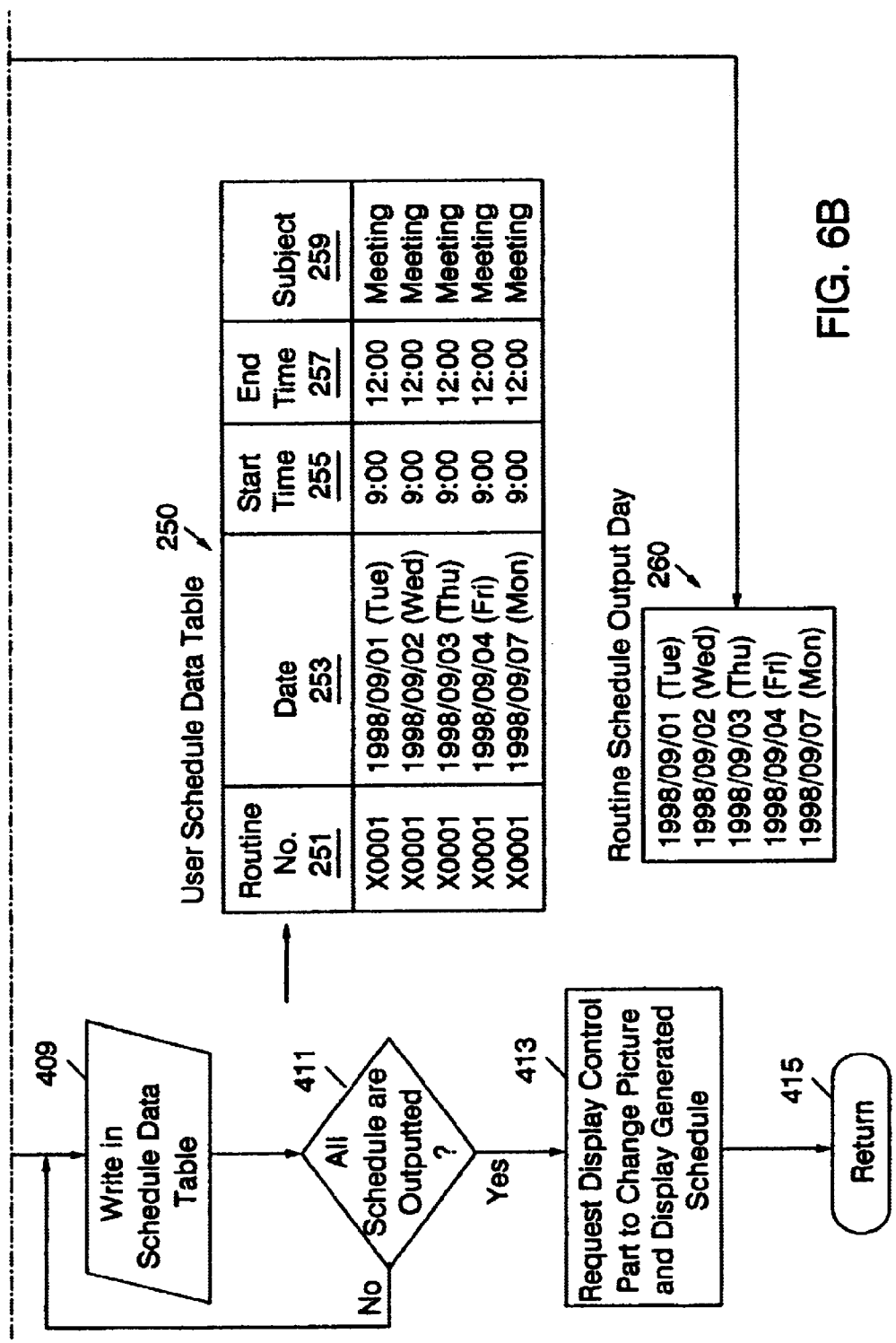
FIG. 6 is a flow chart showing a routine schedule input procedure of this invention.

The holiday management tables 123, 133 are tables for specifying days which are treated as a holiday. The holiday management tables 123, 133 are registered in all servers existing in the schedule management system in the preferred embodiment of this invention. FIG. 5 is a schematic chart of the holiday management table in the preferred embodiment of this invention. As shown in FIG. 6, information of dates of national holidays (month/day or year/month/day) 231, the name of the national holiday 233, dates of company holiday (month/day or year/month/day) 235 and the name of the company holiday 237 is managed in the holiday management table 230 in the preferred embodiment of this invention.

Figure 2:
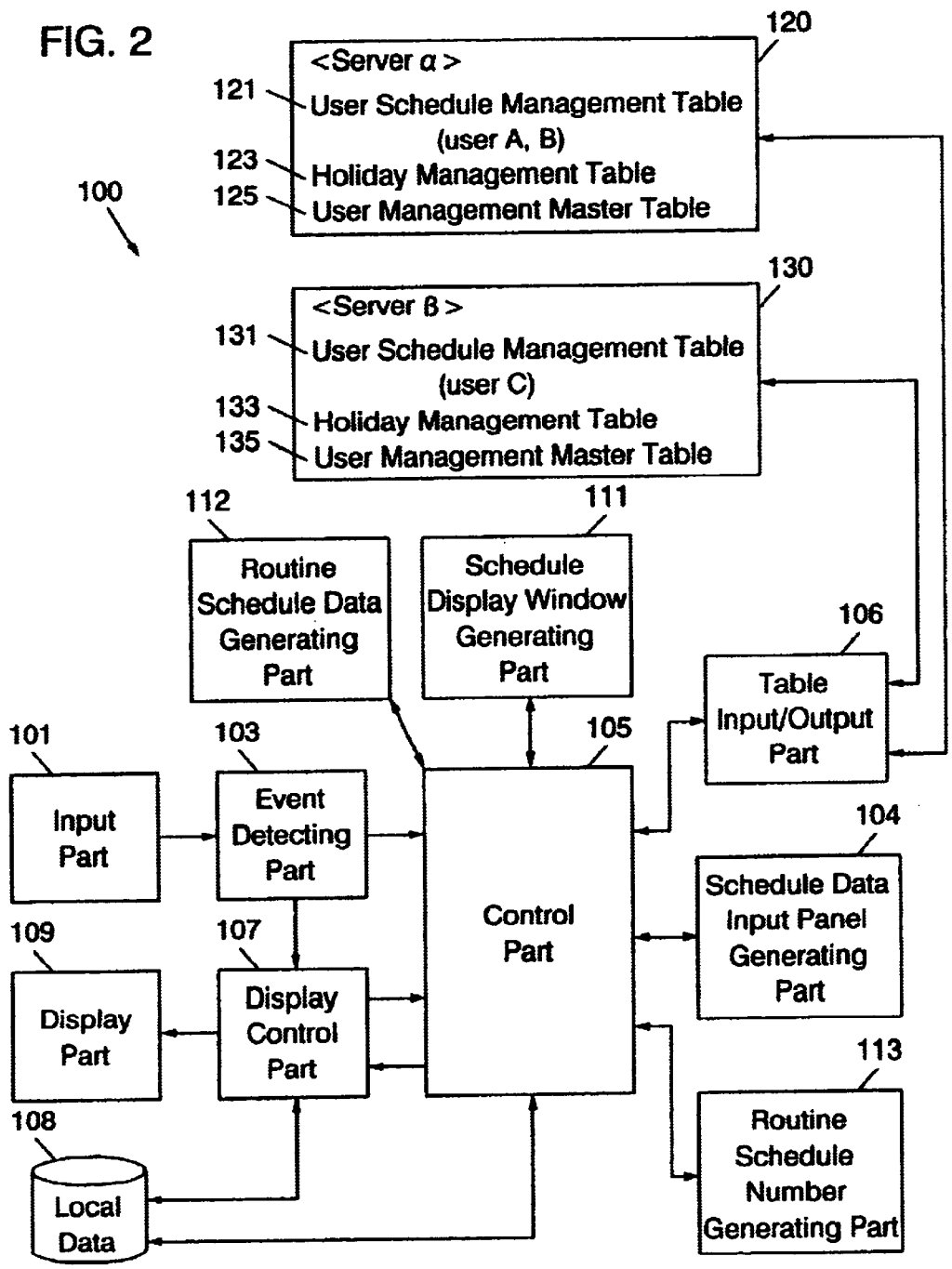
FIG. 2 is a block diagram of components.

While functional blocks shown in FIG. 2 have been described in the above, they are logical functional blocks and it is not meant that each of them is implemented by an independent hardware or software. It should be understood that they can be implemented by a compound or common hardware or software.

C. Description of Operation

C-1. Schedule Input

Figure 12A:
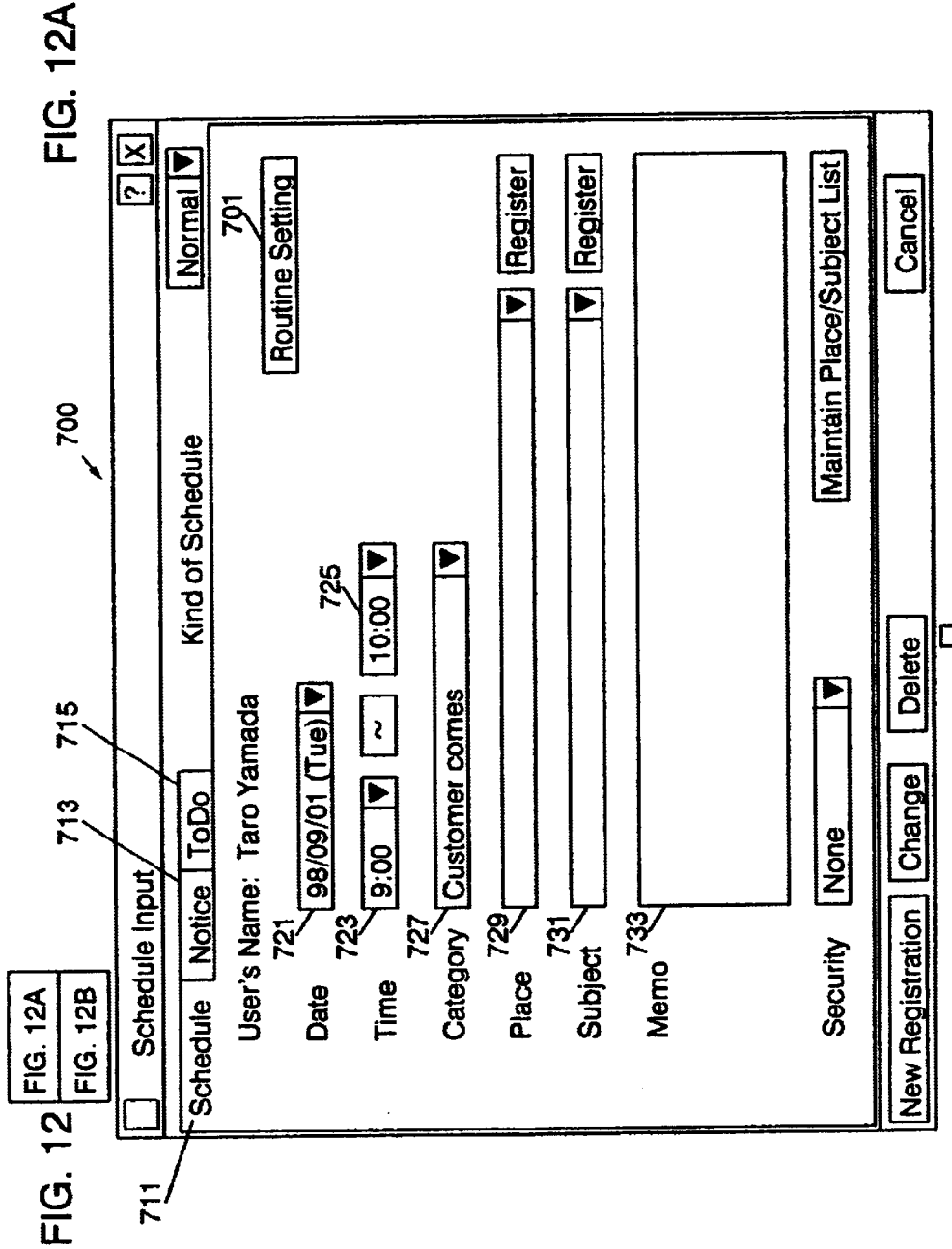
FIG. 12 is a chart showing a schedule data input panel in the preferred embodiment of this invention.
Figure 12B:

FIG. 6 is a flow chart showing a routine schedule input procedure in the preferred embodiment of this invention. FIG. 12 is a diagram showing a schedule data input panel in the preferred embodiment of this invention. When a user for whom a schedule is to be inputted is selected and an icon instructing a schedule input is clicked by an operator, the control part 105 obtains a user name (information specifying a user such as a user ID and user index) and a specific reference date of the schedule of the user and instructs the schedule data input panel generating part 104 to generate a schedule data input panel. The display control part 107 delivers a reflection of the information generated by the schedule data input panel generating part 104 to the display part 109. A panel 700 for inputting routine schedule data is thus displayed on the display screen. When an icon 701 instructing input of routine schedule data is clicked, the event detecting part 103 detects this and the procedure is started.

When the procedure is started, the schedule data input panel generating part 104 switches the content of the schedule data input panel to a content for inputting a routine schedule. The display control part 107 delivers a reflection of information switched by the schedule data input panel generating part 104 to the display part 109. A panel for inputting routine schedule data is thus displayed in the display screen.

As shown in FIG. 12, the routine schedule data input panel 700 has entries of a routine period starting date 721, a routine period ending date 722, a starting time 723, an ending time 725 and other items 729–733. Also, a routine condition can be set up by clicking the routine pattern input tag 715.

Figure 13:
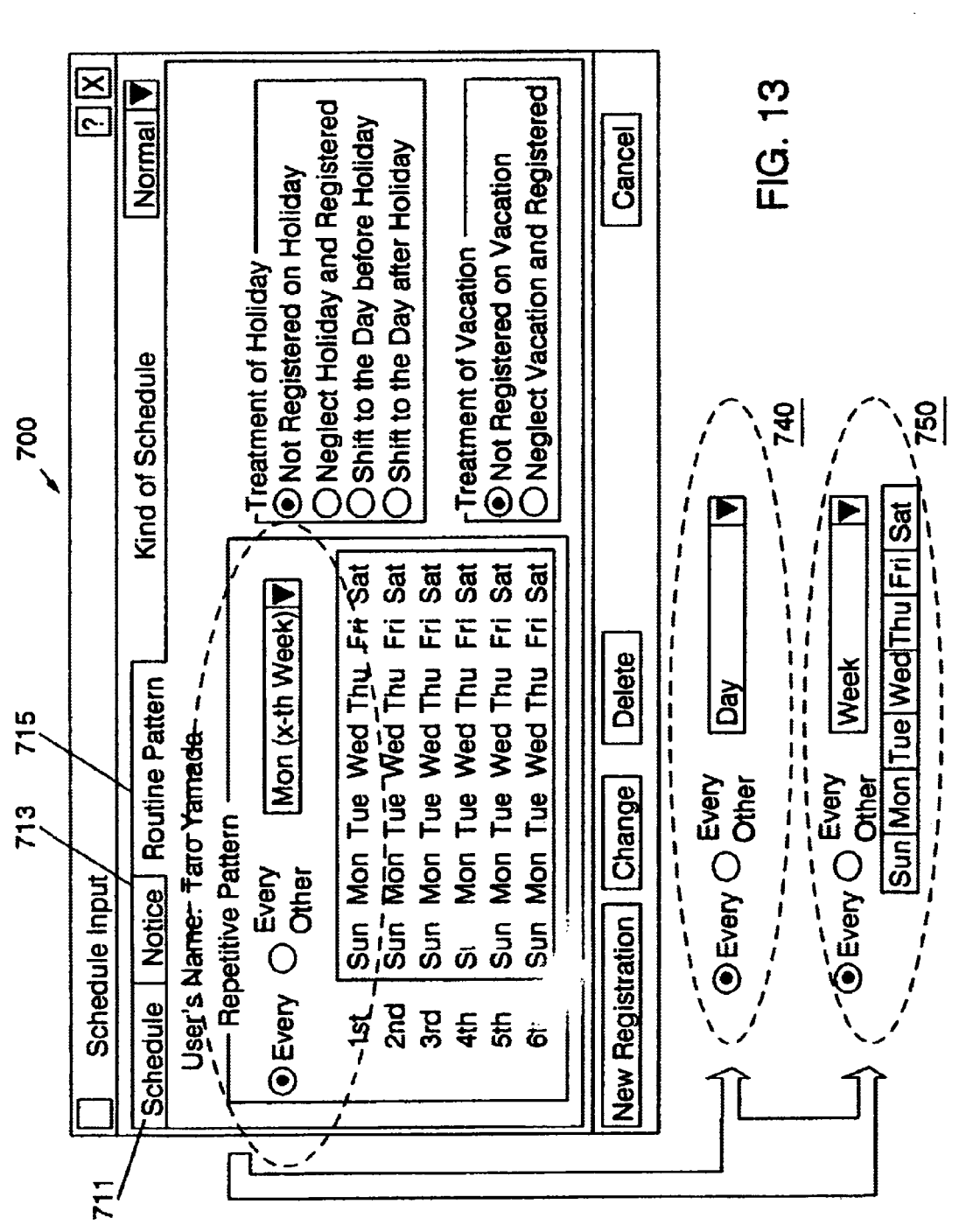

FIG. 13 is a diagram showing the panel for inputting a routine condition in the preferred embodiment of this invention. As shown in FIG. 15, 2 kinds of conditions, a basic condition such as every day, every other day (or every n+1 days), every second Wednesday of a month (or every m-th particular week day of a month), and an exceptional condition such as "a holiday is not registered" and "a registration on a holiday is shifted up to the previous day" can be set up as a routine condition. It is also possible to set up a schedule on certain week days of the 1st to the 6th weeks.

When input data shown in FIG. 6 is inputted and a registration icon is clicked by an operator (block 403), the routine schedule data generating part 112 obtains information of holidays related to the output of the routine schedule from the holiday management table 230 using the information of the routine period 217 and the routine condition 219 and calculates the date on which the routine schedule is outputted (block 405).

For example, when the routine period is from 1998/09/01 to 1998/09/17, the routine basic condition is every other day and the routine exceptional condition is "excluding Sunday, national holiday, and the 2nd and the 4th Saturdays", a date matching the basic condition is calculated by the following equation.

$$D=SDD+2(n-1)(D<FDD)$$

where;

SDD is an integer which is the starting date of the period converted to the number of days from a specific reference date and FDD is an integer which is the ending date of the period converted to the number of days from a specific reference date (in the case of every x+1 days, this is calculated by $D=SDD+(x+1)*(n-1)$ (where $D<FDD$)).

In this example, the dates matching the basic condition are;

September 01, 03, 05, 07, 09, 11, 13, 15, and 17, 1998.
The dates matching the exceptional condition during the routine period are;
Sunday: September 06 and 13
The 2nd Saturday; September 12
National Holiday; September 15

By excluding the dates matching the exceptional condition from the dates matching the basic condition, September 01, 03, 05, 07, 09, 11 and 17 are derived.

When the dates outputted as a routine schedule have been calculated, a routine schedule number is then generated by the routine schedule number generating part 113 (block 407). The routine schedule number is generated as a number which can be uniquely identified in the user.

The table input/output part 106 accesses to a schedule data table server of each user using the address of the schedule data table server obtained from the user management master table to write a generated routine number 251, data of the starting time 211, the ending time 213 and the subject 215 inputted from the input panel in the schedule data table 250 of that user for each date (blocks 409, 411).

A schedule display window is then regenerated to change the schedule display status (block 413). In the preferred embodiment of this invention, the display control part 107 sets the display attribute of the schedule data including a routine number 251 to one which is different from other schedule (attributes of color, mesh, underscore, etc.) so that it is instantly recognized as a sum schedule.

C-2. Change of Schedule

FIG. 7 is a flow chart showing a procedure of changing one of group routine schedule in the preferred embodiment of this invention. When a schedule to be changed is selected by a double clicking operation and the content of the schedule is changed by an operator, the event detecting part 103 detects this and the procedure is started (blocks 451, 453).

Data 253–259 other than the routine number is changed and written in the user schedule data management table 250 (blocks 455, 457). A schedule display window is then regenerated to change the schedule display status (block 413).

Figures 8, 8A, 8B:
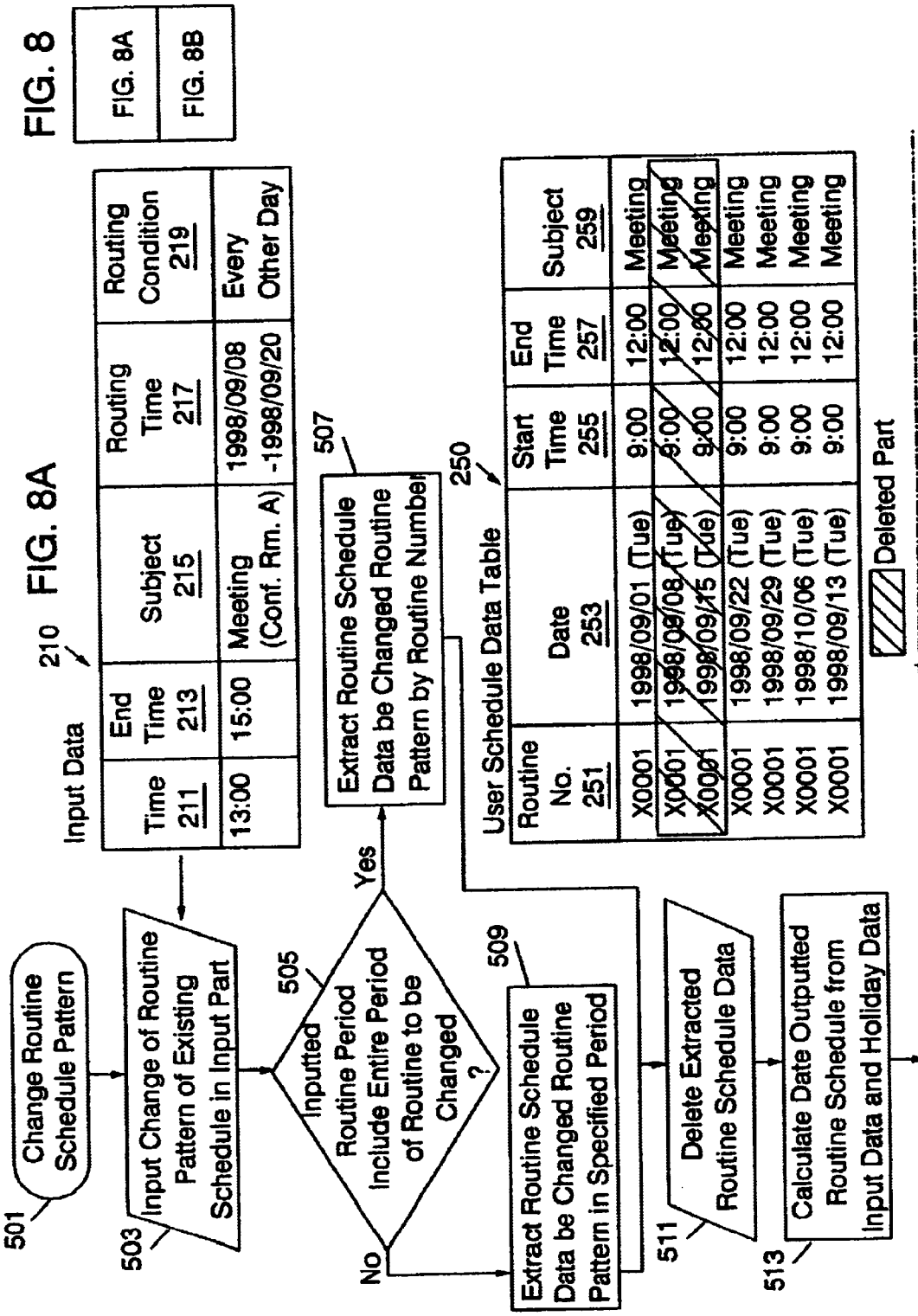
FIG. 8 is a flow chart showing the procedure of changing a plurality of routine schedules of this invention.
Figure 8B:
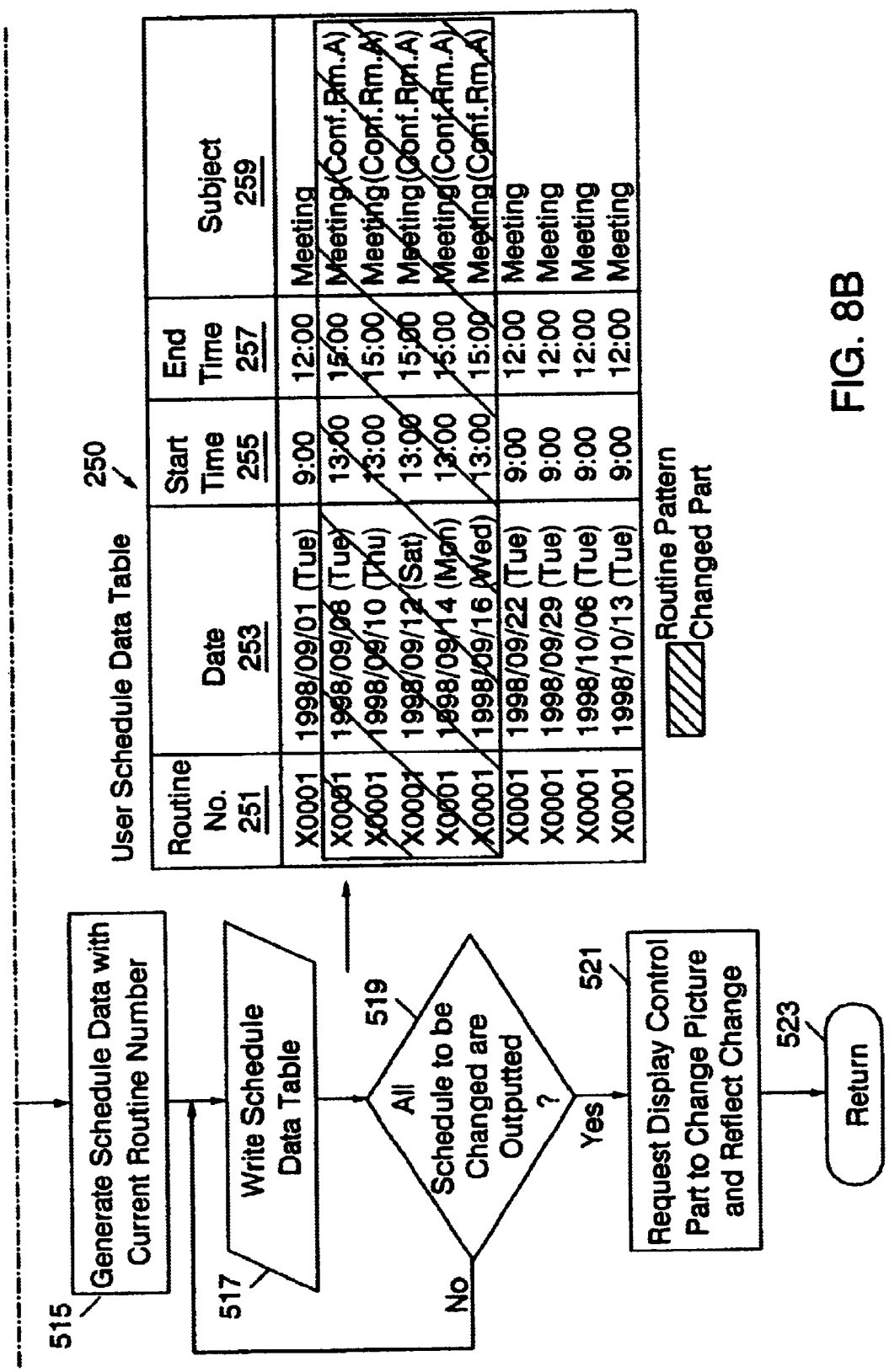

FIG. 8 is a flow chart showing the procedure of changing a plurality of routine schedules in the preferred embodiment of this invention. When a schedule to be changed is selected by an operator, an input panel for changing the routine schedule is displayed. When the operator changes the content of the schedule and clicks an OK button, the event detecting part 103 detects this and the procedure is started (blocks 501, 503).

The control part 105 first determines whether or not the inputted routine period includes the entire period of the routine schedule to be changed (block 503). Specifically, the control part 105 accesses to the user schedule data tables 121, 131 via the table input/output part 106 and searches data having a same routine schedule number as the specified routine schedule to detect the earliest and the latest dates of the currently registered routine schedule.

When it is determined that the inputted routine period includes the entire period of the routine schedule to be changed, all existing routine schedule data items having the same routine schedule number as the schedule selected by the operator are extracted (block 507). When it is determined that the inputted routine period does not include the entire period of the routine schedule to be changed, the existing routine schedule data items having the same routine schedule number as the schedule selected by the operator are extracted in a specified period (block 509).

The extracted routine schedule data are deleted (block 511). Information of holidays related to the output of the routine schedule is then obtained from the holiday management table 230 based on the information of the routine period 217 and the routine condition 219 in the manner similar to the procedure of "C-1. Schedule Input" and the date for which the routine schedule is outputted is calculated (block 513).

When the date which is outputted as a routine schedule is calculated, changed data is written in the schedule data table 250 with the current routine schedule number as the routine schedule number (block 515). In this example, the schedule of the meeting of every Tuesday 9:00 to 12:00 has been changed to a schedule of every other day 13:00 to 15:00 in a specified period.

When the data of the schedule data table 250 has been changed, the schedule display window is regenerated to change the schedule display status (block 521). Because a same routine number as the previous number is assigned even when a part or all of the routine schedule is changed in the preferred embodiment of this invention, a change or deletion in a bundle or a partial change can be done even after the change is processed.

C-3. Deleting Schedule

Figure 9:
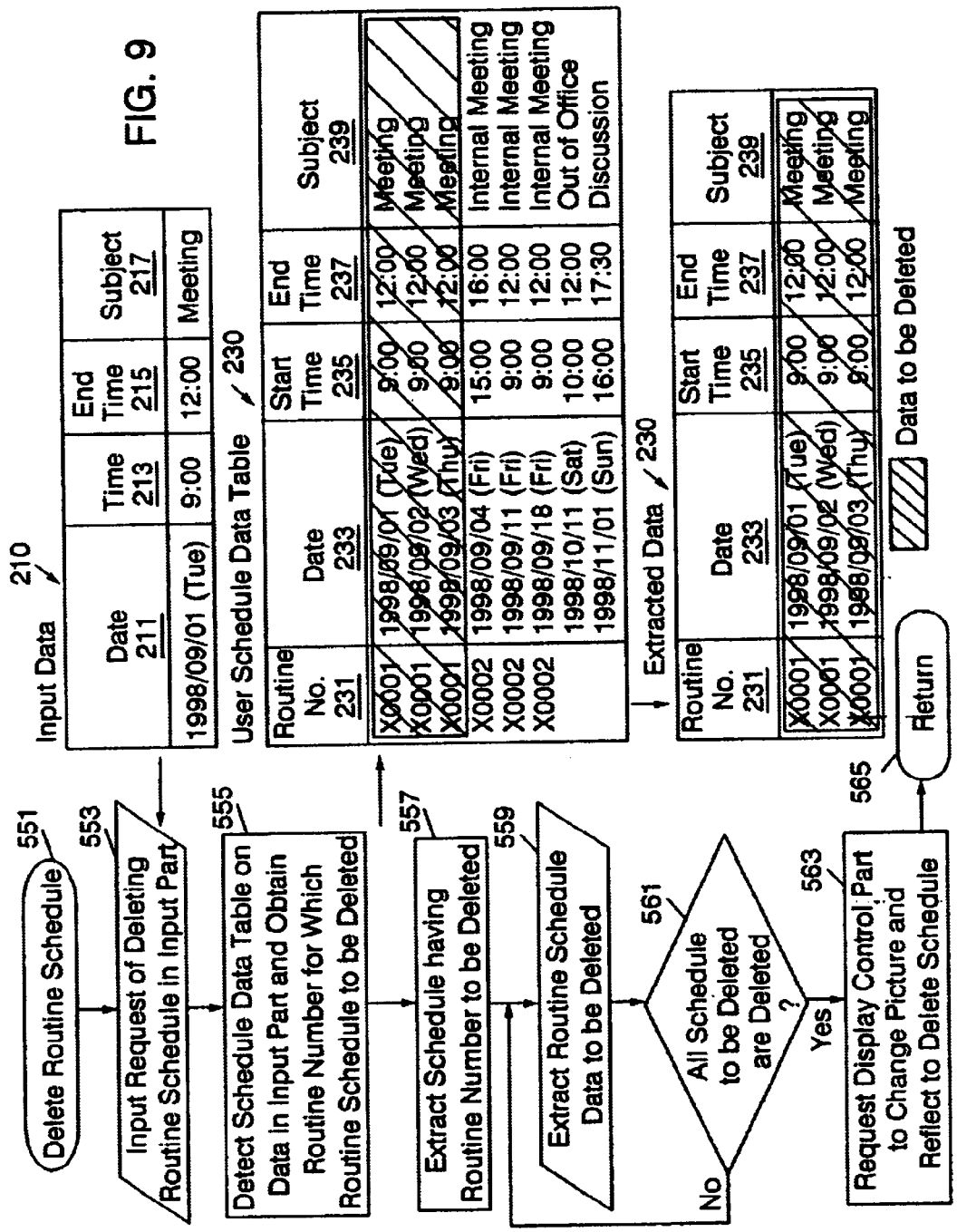
FIG. 9 is a flow chart showing an example of a procedure of deleting in a bundle a routine schedule of of this invention.

FIG. 9 is a, flow chart showing a procedure of deleting a routine schedule in a bundle in the preferred embodiment of this invention. When an operation requesting deletion of a routine schedule is done by an operator, the event detecting part 103 detects this and the procedure is started (blocks 551, 553).

In the preferred embodiment of this invention, the operation requesting deletion of a routine schedule may include depression of a delete key or clicking a delete icon of a menu while one of the routine number is selected by a pointing device.

The control part 105 then obtains a specified routine number (block 555). Thereafter, the control part 105 accesses to the schedule data management table 250 via the table input/output part 106 to delete the schedule data having that routine number (blocks 557, 561).

When the data of the schedule data table 250 has been changed, the schedule display window is regenerated to change the schedule display status (block 563). Because a same routine number as the previous number is assigned even when a part or all of the routine schedule is changed in the preferred embodiment of this invention, such deletion in a bundle can be done even after the change is processed.

Figure 10:
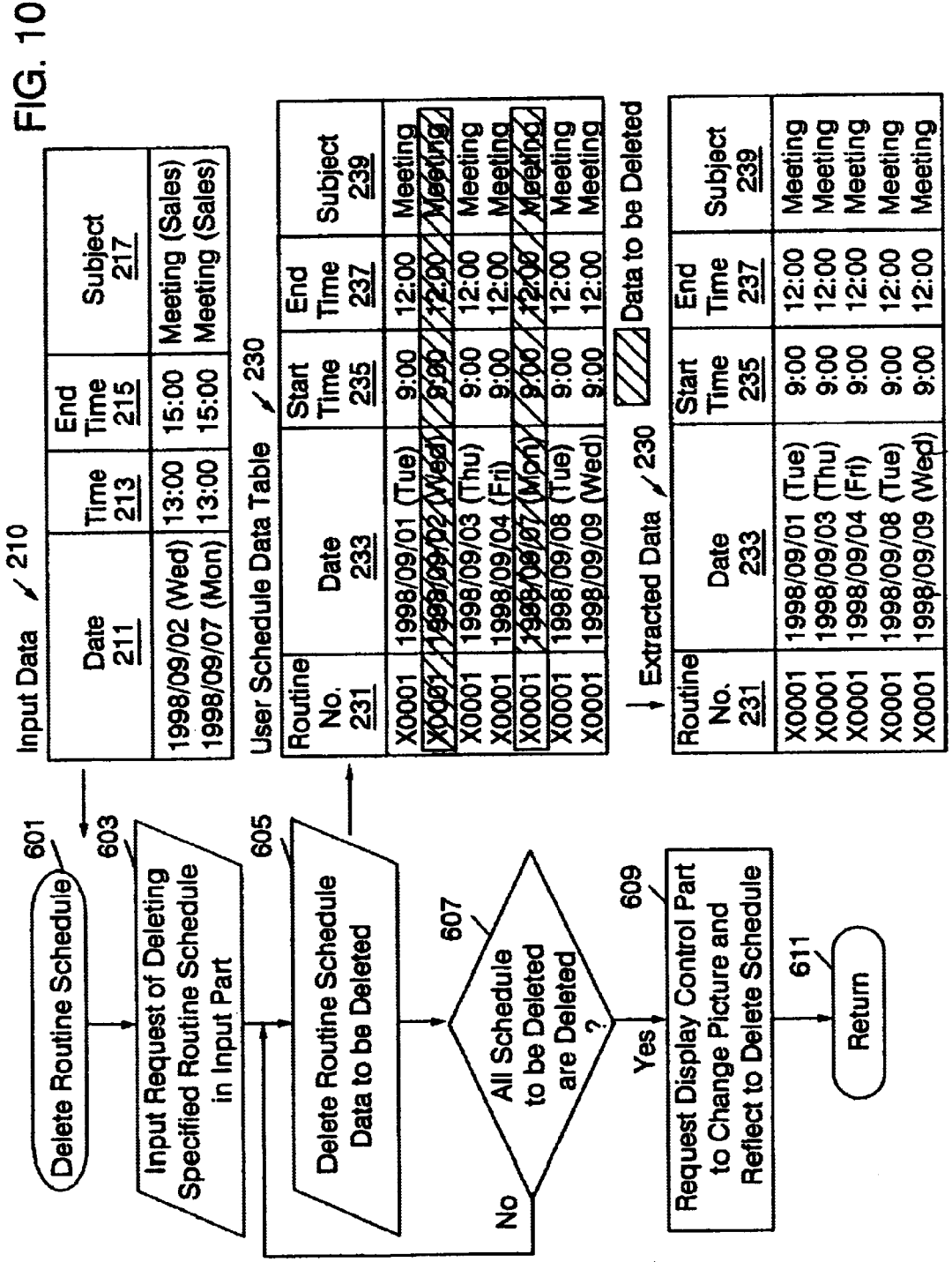
FIG. 10 is a flow chart showing an example of a procedure of deleting a part of a routine schedule of this invention.

FIG. 10 is a flow chart showing a procedure of deleting a part of a routine schedule in the preferred embodiment of this invention. When an operation requesting deletion of a part of a routine schedule is done by an operator, the event detecting part 103 detects this and the procedure is started (blocks 601, 603).

In the preferred embodiment of this invention, the operation requesting deletion of a part of a routine schedule may include depression of a delete key or clicking a delete icon of a menu while one of the routine number is selected by a pointing device.

In response to this operation, the control part 105 accesses to the schedule data management table 250 via the table input/output part 106 to delete the routine schedule data (blocks 605, 607).

When the data of the schedule data table 250 has been changed, the schedule display window is regenerated to change the schedule display status (block 609).

C-4. Display Schedule

Figure 11:
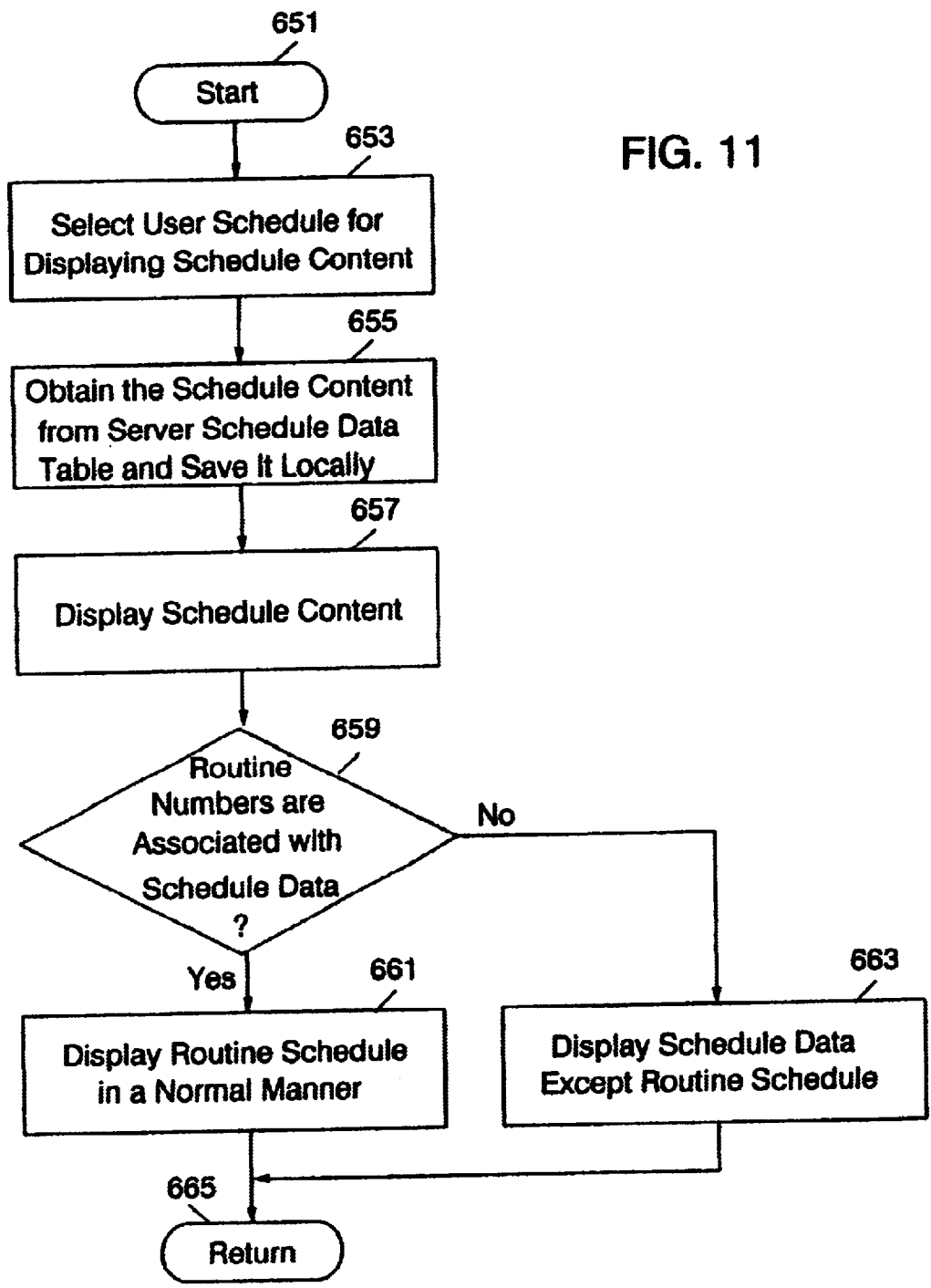
FIG. 11 is a flow chart showing an example of a procedure of displaying schedule data of this invention.

FIG. 11 is a flow chart showing the schedule display procedure in the preferred embodiment of this invention. When an operator selects a schedule to be displayed and instructs to display the content of the schedule, the event detecting part 103 detects this and the procedure is started (blocks 651, 653).

The control part 105 accesses to the user schedule data management table 250 via the table input/output part 106 to obtain the schedule data of interest and save it in the local data storage part 108 (block 655). The local data storage part 108 is then accessed to determine whether or not a routine schedule number is associated with the schedule to be changed (block 659). When a routine schedule number is not associated with the schedule to be changed, the normal schedule is displayed in a normal manner (block 663). When a routine schedule number is associated with the schedule to be changed, the schedule is displayed in a manner different from a normal schedule so that it may be recognized as a routine schedule (block 661).

As described in the above, this invention can flexibly cope with a routine schedule in which a change or deletion of the entire or a part of a schedule occurs without forcing a cumbersome operation to the operator.

Above we have described an embodiment of our invention. A number of modifications and improvements can be made in this embodiment by those skilled in the art. Therefore, it should be understood that the scope of the invention is not limited to this described embodiment but encompassesx the spirit and scope of the appended claims.

We claim:

1. A computer operated method of displaying schedule data on a schedule management apparatus having a display screen and an input device, said method comprising the computer performed steps of:

(a) receiving a user input including a schedule starting time, a schedule ending time for a plurality of events where certain but not all of the events form a series of periodically reoccurring events associated with at least one condition for establishing a plurality of dates one date for each of the events in the series to occur, (b) generating and registering schedule data including a schedule starting time and a schedule ending time which are associated with a common routine number for the plurality of dates established by said condition, (c) displaying on the display screen with all events arranged together in chronological order and identified by the routine number with schedule data for events which are established by the condition associated with said routine number distinctively presented from schedule data for events which is not established by the condition associated with the routine number, and (d) providing a plurality of said conditions, at least one being a basic condition for establishing the periodicity of the dates to be established and at least another being an exceptional condition for excluding, from the plurality of dates certain dates selected by the basic condition.

2. The method of claim 1 wherein the events are meeting, the periodicity of dates are at least one of the monthly, weekly or daily periods, and the certain dates are at least one of holidays, weekends, and vacation days.

3. The method of claim 1 including presenting schedule data for events established by the condition and those not established by the condition with different backgrounds.

4. A computer operated method of displaying schedule data on a schedule management apparatus having a display screen and an input device, said method comprising the computer performed steps of:

(a) displaying a schedule data input panel in response to an operators operation instructing a schedule input, (b) receiving a user input including a schedule starting time, a schedule ending time for a series of periodically occurring events, a basic condition of a day on which each of the events in the schedule is set and an exceptional condition of a day on which each of the events in the schedule cannot be set in said schedule data input panel, (c) calculating a plurality of setting dates corresponding to said basic condition of a proposed day for a setting date and said exceptional condition of a day on which a proposed setting date cannot be set, (d) generating a routine number having a common value which is allocated to each of the schedule data of said plurality of setting dates, (e) generating schedule data including a schedule starting time and a schedule ending time for each of said plurality of setting dates and storing them in association with said routine number, and (f) displaying schedule data which is associated with said routine number distinctively from schedule data which is not associated with the routine number where both the associated and non-associated schedule data are displayed together in chronological order with the routine number.

5. A computer operated method of displaying schedule data on a schedule management apparatus having a display screen and an input device, said method comprising the computer performed steps of:

(a) receiving a user input including a schedule starting time, a schedule ending time for a series of periodically occurring events over a range of dates and a condition for establishing the days of the events of the series, (b) generating and registering schedule data including a schedule starting time and a schedule ending time which are associated with a common-routine number for each of a plurality of dates determined by said condition, (c) displaying schedule data which is associated with said routine number, (d) obtaining information of a changed period in the range of dates and changed content in that changed period inputted by an operator, (e) reregistering user schedule data with the changed content for the periodically occurring events included in said changed period and associated with the routine number, (f) displaying the reregistered schedule data on the display screen so that it is distinguishable from other schedule data in a list where both the reregistered and other schedule data appear together in a single list in chronological order identified by the routine number, and (g) providing a plurality of said conditions, at least one being a basic condition for establishing the periodicity of the dates to be established and at least another being an exceptional condition for excluding, from the plurality of dates certain dates selected by the basic condition.

6. The method of claim 5 including the step of not reregistering user schedule data not associated with the routine number or outside the changed period.

7. A schedule management apparatus having a display screen and an input device, said apparatus comprising:

(a) a schedule data input panel displayed in response to an operator's operation instructing a schedule input for receiving a user input including a schedule starting time, a schedule ending time for a series of periodically occurring events to take place over a range of dates, a basic condition of a day on which each of the events in the schedule is set and an exceptional condition of a day on which in which each of the events in schedule cannot be set in said schedule data input panel, (b) a routine number generating part for generating a routine number, (c) a routine schedule data generating part for calculating a plurality of setting dates corresponding to said basic condition of a day on which the schedule is set and said exceptional condition of a day on which the schedule cannot be set, and generating schedule data including a schedule starting time and a schedule ending time for each of said plurality of setting dates, (d) a display control part for displaying schedule data which is associated with said routine number distinctively from schedule data which is not associated with a routine number in a common list where all schedule data are listed chronologically, (e) a user schedule data input panel for obtaining information of a changed period and a changed content inputted by an operator in the user schedule dates, and (f) a control part for reregistering user schedule data including the changed content included in said obtained changed period and associated with the routine number.

8. The method of claim 5 including displaying the reregistered schedule data with a different background than the other schedule data.

9. A storage medium storing a schedule management program for displaying schedule data on a schedule management apparatus having a display screen and an input device, said program comprising:

(a) a program code instructing said schedule management apparatus to receive a user input including a schedule starting time for a plurality of events to take place over a period of time, a schedule ending time and a condition establishing a day on which certain events in the schedule is set, (b) program code instructing said schedule management apparatus to generate and registering schedule data including a schedule starting time and a schedule ending time the certain events which are associated with a common routine number for each of a plurality of dates corresponding to said condition, (c) program code instructing said schedule management apparatus to display schedule data which is associated with said routine number distinctively from schedule data which is not associated with the routine number in a list where all schedule data are arranged in a single chronological list identified by the one routine number, and (d) providing a plurality of said conditions, at least one being a basic condition for establishing the periodicity of the dates to be established and at least another being an exceptional condition for excluding, from the plurality of dates certain dates selected by the basic condition.

10. A storage medium storing a schedule management program for displaying schedule data on a schedule management apparatus having a display screen and an input device, said program comprising:

(a) program code instructing said schedule management apparatus to display a schedule data input panel in response to an operator's operation instructing a schedule input, (b) program code instructing said schedule management apparatus to receive a user input including a schedule starting time, a schedule ending time for each of a plurality of events to occur over a period of time, a basic condition of a day on which each date of the schedule cannot be set and an exceptional condition of a day on which at least one date in the schedule cannot be set in said schedule data input panel, (c) program code instructing said schedule management apparatus to calculate a plurality of setting dates corresponding to said basic condition of a day on which a schedule is set and said exceptional condition of a day on which a schedule cannot be set, (d) program code instructing said schedule management apparatus to generate a routine number having a common value which is allocated to each of the schedule data of said plurality of setting dates, (e) program code instructing said schedule management apparatus to generate schedule data including a schedule starting time and a schedule ending time four each of said plurality of setting dates and storing them in association with said routine number, and (f) program code instructing said schedule management apparatus to display schedule data which is associated with said routine number distinctively from schedule data which is not associated with the routine number in a single list containing all schedule data arranged in chronological order and identified by the routine number.

* * * * *